United States Patent

Hierstetter et al.

[11] Patent Number: 5,840,951
[45] Date of Patent: Nov. 24, 1998

[54] ORGANOSILICON COMPOUNDS CONTAINING AMINO GROUPS, THEIR PREPARATION AND THEIR USE

[75] Inventors: Thomas Hierstetter, Woehlerstr.6; Jochen Dauth, Trebnitzerstr.16; Joerg Pfister, Spinnereistr.86; Bernward Deubzer, Virchowstr.14, all of Germany

[73] Assignee: Wacker-Chemie GmbH, Germany

[21] Appl. No.: 888,405

[22] Filed: Jul. 7, 1997

[30] Foreign Application Priority Data

Sep. 18, 1996 [DE] Germany ................. 196 38 125.8

[51] Int. Cl.$^6$ ....................................... C07F 7/10
[52] U.S. Cl. ................. 556/425; 556/423; 556/424; 528/15; 528/28
[58] Field of Search .................... 556/425, 423, 556/424; 528/15, 28

[56] References Cited

U.S. PATENT DOCUMENTS 3,203,825  8/1965  Stevens et al. .
3,892,643  7/1975  Tanaka et al. .

(List continued on next page.)

FOREIGN PATENT DOCUMENTS 0110370  4/1987  European Pat. Off. .
0476426  3/1992  European Pat. Off. .

(List continued on next page.)

OTHER PUBLICATIONS

K.A. Andrianor et al., Izv. Akad. Nank. SSSR, Ser. Khim, Issue 2, 351–356 (1968) "Reaction of 1,3–Dihydromethyl-disilazanes and 1,3–Dihydrotetramethyldisiloxanes with Allylamines".

(List continued on next page.)

*Primary Examiner*—Paul F. Shaver
*Attorney, Agent, or Firm*—Brooks & Kushman P.C.

[57] ABSTRACT

Organosilicon compounds containing amino groups, their preparation and their use Organosilicon compounds containing amino groups and comprising a) siloxane units of the formula $$R_aSi(OR^1)_bO_{(4-a-b)/2} \qquad (I)$$

and b) at least one unit per molecule selected from the group consisting of units of the formulae $$AR_cSiO_{(4-c-1)/2} \qquad (II),$$

$$O_{(4-c-1)/2}R_cSi-A^1-R_cSiO_{(4-c-1)/2} \qquad (III)$$

or $$O_{(4-c-1)/2}R_cSi-A^2-SiR_cO_{(4-c-1)/2}, \qquad (IV)$$
$$\qquad\qquad\qquad | $$
$$\qquad\qquad SiR_cO_{(4-c-1)/2}$$

where

R is an identical or different hydrocarbon radical which has from 1 to 18 carbon atoms, optionally substituted by halogen atoms, alkoxy groups or hydroxy groups where the hydrocarbon radical is optionally interrupted by oxygen atoms, $R^1$ is an identical or different alkyl radical which is optionally interrupted by oxygen atoms, a is 0, 1, 2 or 3 and b is 0, 1, 2 or 3, with the proviso that the sum a+b is not greater than 3, and c is 0, 1 or 2, A is a radical of the formula $$-R^2R^3{}_zN(-CR^4{}_2-R^5)_{(2-z)} \qquad (V),$$

$A^1$ is a radical of the formula $$-R^2R^3{}_zN-R^2- \qquad (VI)$$
$$\qquad | $$
$$(CR^4{}_2-R^5)_{(1-z)}$$

and $A^2$ is a radical of the formula $$-R^2N-R^2- \qquad (VII)$$
$$\quad | $$
$$-R^2$$

where z is 0 or 1, $R^2$ is an identical or different alkylene radical having from 2 to 8 carbon atoms, or a radical of the formula $$-CH=CH-CH_2-,\quad -C-CH_2-\ \text{or}\ -CH_2-CH-CH_2-$$
$$\qquad\qquad\qquad\ \ \|\qquad\qquad\qquad\qquad\quad |$$
$$\qquad\qquad\qquad\ CH_2\qquad\qquad\qquad\qquad CH_3$$

$R^3$ is a hydrogen atom or an alkyl radical having from 1 to 8 carbon atoms, $R^4$ is a hydrogen atom or an alkyl radical having from 1 to 8 carbon atoms, $R^5$ is a radical of the formulae $-CR^6=CR^6{}_2$, $-C\equiv CR^6$, where $R^6$ is identical or different and is a hydrogen atom or an alkyl radical having from 1 to 8 carbon atoms, with the proviso that the organosilicon compound containing amino groups has at least one siloxane unit of formula (II) per molecule and at least one unit selected from the group consisting of units of formulae (III) and (IV) per molecule.

7 Claims, No Drawings

5,840,951
Page 2

U.S. PATENT DOCUMENTS

| | | |
|---|---|---|
| 4,292,434 | 9/1981 | Lindner et al. . |
| 5,118,777 | 6/1992 | Okawa ................................ 556/425 X |
| 5,132,443 | 7/1992 | Traver et al. ........................... 556/425 |
| 5,241,034 | 8/1993 | Herzig et al. . |
| 5,276,123 | 1/1994 | King et al. .......................... 556/425 X |
| 5,591,818 | 1/1997 | Standke et al. ......................... 556/425 |

FOREIGN PATENT DOCUMENTS

| | | |
|---|---|---|
| 0523660 | 1/1993 | European Pat. Off. . |
| 0342518 | 11/1994 | European Pat. Off. . |
| 2421038 | 12/1974 | Germany . |
| 43440821 | 12/1994 | Germany . |
| 1409741 | 10/1975 | United Kingdom . |

OTHER PUBLICATIONS

Du, Zudong and Yu, Jing, Hecheng Xiangjao Gongye 9 (6), 388–392 (1986).

"Synthesis of a new Silicone rubber with N,N–Disallyl–gamma–aminopropyl side chains".

Chemical Abstract AN 95–023877/04 for DE–4344082–C1.

ORGANOSILICON COMPOUNDS CONTAINING AMINO GROUPS, THEIR PREPARATION AND THEIR USE

BRIEF SUMMARY OF THE INVENTION

The present invention relates to organosilicon compounds containing reactive amino groups, their preparation and their use.

BACKGROUND OF THE INVENTION

The publication by K. Andrianov, Izv. Akad. Nauk. SSSR, Ser. Khim, Issue 2, 351–356 (1968) describes the reaction of isopropyldiallylamine or triallylamine and 1,3-dihydrotetramethyldisilazane or 1,3-dihydrotetramethyldisiloxane by means of hydrosilylation. In this reaction, the reactants are used in a molar ratio of from at least 2:1 to about 5:1 based on 1,3-dihydrotetramethyldisilazane or 1,3-dihydrotetramethyldisiloxane and isopropyldiallylamine or triallylamine used. The 1,3-dihydrotetramethyldisilazane or 1,3-dihydrotetramethyldisiloxane used reacts to a lesser extent (26–44%) in each case once with the isopropyldiallylamine or triallylamine used. For example, the reaction of triallylamine with 1,3-dihydrotetramethyldisiloxane gives tris[3-(1',1',3,3'-tetramethyldisiloxy)propyl]amine in a yield of only 21% as the only isolable compound which, however, contains no allyl groups but only Si-bonded hydrogen.

The publication by Du, Zuodong and Yu, Jing, Hecheng Xiangjiao Gongye 9(6), 388–92 (1986) describes silicone rubbers containing N,N-diallyl-γ-aminopropyl side chains. Their synthesis proceeds via a hydrosilylation of the monofunctional heptamethylcyclotetrasiloxane with triallylamine to give heptamethyl-N,N-diallyl-γ-aminopropylcyclotetrasiloxane which is reacted by ring opening to give the corresponding polymer (silicone rubber). This is a reaction between the molecular and monofunctional heptamethylcyclotetrasiloxane building block with a further molecular building block, the triallylamine, without danger of a crosslinking reaction or a build up of the chain. The synthesis of the silicone rubber takes place as a two-stage reaction via the circuitous route of hydrosilylation of the triallylamine on heptamethylcyclotetrasiloxane.

EP 342 518 B1 (issued on Nov. 30, 1994, General Electric Co.) describes a process for preparing nitrogensilicon compounds which are obtained by hydrosilylation of an olefinic amine on Si—H-functional polydiorganosiloxanes. The amine components used here are monoallylamines.

DE 43 44 082 C1 (issued on Dec. 22, 1994, Th. Goldschmidt AG) describes a process for preparing organopolysiloxanes containing secondary aminoalkyl groups bound to silicon via carbon. In this reaction, secondary aminoalkenes containing only one double bond per molecule are added onto Si—H-bearing organosilicon compounds by means of hydrosilylation with platinum catalysis. The resulting organopolysiloxanes containing secondary aminoalkyl groups bound to silicon via carbon can, optionally, be equilibrated with, for example, cyclic polyorganosiloxanes.

DETAILED DESCRIPTION OF THE INVENTION

The invention provides organosilicon compounds containing amino groups, comprising;
a) siloxane units of the formula $$R_a Si(OR^1)_b O_{(4-a-b)/2} \quad (I)$$

where

R is an identical or different hydrocarbon radical which has from 1 to 18 carbon atoms, optionally substituted by halogen atoms, alkoxy groups or hydroxy groups where the hydrocarbon radical is optionally interrupted by oxygen atoms, $R^1$ is an identical or different alkyl radical which is optionally interrupted by oxygen atoms, a is 0, 1, 2 or 3 and b is 0, 1, 2 or 3, with the proviso that the sum a+b is not greater than 3, and b) per molecule at least one unit selected from the group consisting of units of the formulae $$AR_c SiO_{(4-c-1)/2} \quad (II),$$

$$O_{(4-c-1)/2} R_c Si-A^2-R_c SiO_{(4-c-1)/2} \quad (III)$$

or $$O_{(4-c-1)/2} R_c Si-A^2-SiR_c O_{(4-c-1)/2}, \quad (IV)$$
$$\qquad\qquad\qquad |$$
$$\qquad\qquad SiR_c O_{(4-c-1)/2}$$

where

R is identical or different and has the meaning given above for R, c is 0, 1 or 2, preferably 2, A is a radical of the formula $$-R^2 R^3{}_2 N(-CR^4{}_2-R^5)_{(2-z)} \quad (V),$$

$A^1$ is a radical of the formula $$-R^2 R^3{}_2 N-R^2- \quad (VI)$$
$$\qquad |$$
$$(CR^4{}_2-R^5)_{(1-z)}$$

and $A^2$ is a radical of the formula $$-R^2 N-R^2- \quad (VII)$$
$$\quad |$$
$$-R^2$$

where z is 0 or 1, $R^2$ is an identical or different alkylene radical having from 2 to 8 carbon atoms, or a radical of the formula $$-CH=CH-CH_2-, \quad -C-CH_2- \quad \text{or} \quad -CH_2-CH-CH_2-$$
$$\qquad\qquad\qquad\qquad\quad \| \qquad\qquad\qquad\qquad\qquad |$$
$$\qquad\qquad\qquad\qquad\quad CH_2 \qquad\qquad\qquad\qquad\qquad CH_3$$

$R^3$ is a hydrogen atom or an alkyl radical having from 1 to 8 carbon atoms, $R^4$ is a hydrogen atom or an alkyl radical having from 1 to 8 carbon atoms, $R^5$ is a radical of the formulae $-CR^6=CR^6{}_2$, $-C\equiv CR^6$, where $R^6$ is identical or different and is a hydrogen atom or an alkyl radical having from 1 to 8 carbon atoms, with the proviso that the organosilicon compound containing amino groups has at least one siloxane unit of formula (II) per molecule and at least one unit selected from the group consisting of units of formulae (III) and (IV) per molecule.

The organosilicon compounds of the invention preferably comprise no further units apart from the units of the formulae (I), (II), (III) and (IV).

Examples of the radical R are alkyl radicals such as the methyl, ethyl, n-propyl, iso-propyl, 1-n-butyl, 2-n-butyl, iso-butyl, tert-butyl, n-pentyl, iso-pentyl, neopentyl or tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical, cycloalkyl radicals such as the cyclopentyl, cyclohexyl, cycloheptyl and methylcyclohexyl radicals, alkenyl radicals such as the vinyl, allyl and 2-propenyl radicals, alkynyl radicals such as the propargyl radical, aryl radicals such as the phenyl, naphthyl, anthryl and phenanthryl radicals, alkaryl radicals such as o-, m-, p-tolyl radicals, xylyl radicals and ethylphenyl radicals, and aralkyl radicals such as the benzyl radical, the α- and β-phenylethyl radical.

Examples of substituted hydrocarbon radicals R are haloalkyl radicals such as the 3,3,3-trifluoro-n-propyl radical, the 2,2,2,2',2',2'-hexafluoroisopropyl radical and the heptafluoroisopropyl radical, and haloaryl radicals such as the o-, m- and p-chlorophenyl radicals, and also radicals of the formula

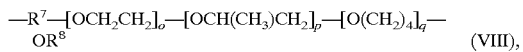

(VIII), where $R^7$ is an alkylene radical having from 1 to 8 carbon atoms, an arylene or aralkylene radical, $R^8$ is a hydrogen atom, an alkyl radical having from 1 to 22 carbon atoms or a radical of the formula —CO—$R^9$ where $R^9$ is an alkyl radical having from 1 to 8 carbon atoms, o is 0 or an integer from 1 to 100, preferably 0 or an integer from 3 to 35, p is 0 or an integer from 1 to 100, preferably 0 or an integer from 3 to 35 and q is 0 or an integer from 1 to 100, preferably 0 or an integer from 3 to 35, with the proviso that the sum o+p+q is >0.

The radical R is preferably a methyl, ethyl, propyl, butyl, cyclohexyl or vinyl radical, with the methyl radical being more preferred.

Examples of radicals $R^7$ are linear or branched alkylene radicals such as the methylene, 1,2-ethylene, 1,3-propylene and 1,2-propylene radical, with the 1,3-propylene and 1,2-propylene radicals being preferred and the 1,3-propylene radical being more preferred.

Examples of radicals $R^8$ are the hydrogen atom and the examples of alkyl radicals given for radical R, with the 5 hydrogen atom, the methyl radical and the n-butyl radical being preferred and the hydrogen atom and the methyl radical being more preferred.

Examples of radicals $R^9$ are the examples given for alkyl radicals R having from 1 to 8 carbon atoms, with the methyl radical being preferred.

Examples of radicals R of the formula (VIII) are —(CH$_2$)$_3$—(OCH$_2$CH$_2$)$_3$—OCH$_3$, —(CH$_2$)$_3$—(OCH$_2$CH$_2$)$_6$—OCH$_3$, —(CH$_2$)$_3$—(OCH$_2$CH$_2$)$_{35}$—OCH$_3$, —(CH$_2$)$_3$—(OCH(CH$_3$)CH$_2$)$_3$—OCH$_3$, —(CH$_2$)$_3$—(OCH(CH$_3$)CH$_2$)$_6$—OCH$_3$, —(CH$_2$)$_3$—(OCH(CH$_3$)CH$_2$)$_{35}$—OCH$_3$, —(CH$_2$)$_3$—(OCH$_2$CH$_2$)$_3$—(OCH(CH$_3$)CH$_2$)$_3$—OCH$_3$, —(CH$_2$)$_3$—(OCH$_2$CH$_2$)$_6$—(OCH(CH$_3$)CH$_2$)$_6$—OCH$_3$, —(CH$_2$)$_3$—(OCH$_2$CH$_2$)$_{35}$—(OCH(CH$_3$)CH$_2$)$_{35}$—OCH$_3$, —(CH$_2$)$_3$—(OCH$_2$CH$_2$)$_3$—OH, —(CH$_2$)$_3$—(OCH$_2$CH$_2$)$_6$—OH, —(CH$_2$)$_3$—(OCH$_2$CH$_2$)$_{35}$—OH, —(CH$_2$)$_3$—(OCH(CH$_3$)CH$_2$)$_3$—OH, —(CH$_2$)$_3$—(OCH(CH$_3$)CH$_2$)$_6$—OH, —(CH$_2$)$_3$—(OCH(CH$_3$)CH$_2$)$_{35}$—OH, —(CH$_2$)$_3$—(OCH$_2$H$_2$)$_3$—(OCH(CH$_3$)CH$_2$)$_3$—OH, —(CH$_2$)$_3$—(OCH$_2$CH$_2$)$_6$—(OCH(CH$_3$)CH$_2$)$_6$—OH, —(CH$_2$)$_3$—(OCH$_2$CH$_2$)$_{35}$—(OCH(CH$_3$)CH$_2$)$_{35}$—OH and —(CH$_2$)$_3$—(OCH$_2$CH$_2$)$_{18}$—(O(CH$_2$)$_4$)$_{18}$—OH.

Examples of the radical $R^1$ are the examples given for alkyl radicals R and the methoxyethyl and ethoxyethyl radicals, with the radical $R^1$ preferably being an alkyl radical which has from 1 to 4 carbon atoms and may be interrupted by oxygen atoms, more preferably the methyl and ethyl radicals.

Examples of the radical $R^2$ are linear or branched alkylene radicals such as the 1,2-ethylene, 1,3-propylene, 1,2-propylene, 1,3-(2-methylpropylene) and dimethylmethylene radicals and also —CH$_2$—CH=CH— and —C(CH$_3$)=CH—.

The radical $R^2$ is a 1,3-propylene or 1,2-propylene radical or —CH$_2$—CH=CH—, with the 1,3-propylene radical being preferred.

Examples of radicals $R^3$, $R^4$ and $R^6$ are, independently of one another, the hydrogen atom and the examples of linear and branched alkyl radicals having from 1 to 8 carbon atoms given for radical R.

The radical $R^3$ is preferably the methyl, ethyl or cyclohexyl radical.

The radical $R^4$ is a hydrogen atom, a methyl radical or an ethyl radical, with the hydrogen atom being preferred.

The radical $R^6$ is a hydrogen atom, a methyl radical or an ethyl radical, with the hydrogen atom being preferred.

Examples of the radical $R^5$ are —CH=CH$_2$, —C(CH$_3$)=CH$_2$, —C≡CH, —C≡C—CH$_3$, —C≡C—C$_2$H$_5$, —CH=CH—CH$_3$, —CH=C(CH$_3$)$_2$, with —CH=CH$_2$ and —C≡CH being preferred and —CH=CH$_2$ being more preferred.

Examples of radicals A are —(CH$_2$)$_3$—NH—CH$_2$CH=CH$_2$, —(CH$_2$)$_3$—N—(CH$_2$CH=CH$_2$)$_2$, —(CH$_2$—CH(CH$_3$)—CH$_2$)—NH—CH$_2$C(CH$_3$)=CH$_2$, —(CH$_2$—CH(CH$_3$)—CH$_2$)—N—(CH$_2$C(CH$_3$)=CH$_2$)$_2$, —(CH$_2$)$_3$—NH—CH$_2$C≡CH and —(CH$_2$)$_3$—N—(CH$_2$C≡CH)$_2$.

Examples of radicals $A^1$ are —(CH$_2$)$_3$—NH—(CH$_2$)$_3$-, —CH=CH—CH$_2$—NH—CH$_2$CH=CH—, CH$_2$=CH—CH$_2$—N—(CH$_2$CH$_2$CH$_2$—)$_2$, (—CH=CH—CH$_2$)$_2$—N—CH$_2$C≡CH, HN—(CH$_2$CH(CH$_3$)CH$_2$—)$_2$ and CH$_2$=C(CH$_3$)—CH$_2$—N(CH$_2$CH(CH$_3$)CH$_2$—)$_2$.

Examples of radicals $A^2$ are N—(CH$_2$CH$_2$CH$_2$—)$_3$, N—(CH$_2$CH=CH—)$_3$ and N—(CH$_2$CH(CH$_3$)CH$_2$—)$_3$.

Examples of the novel organosilicon compounds containing amino groups are those which are built up of the following units:

 a)

-continued $Me_2SiO_{2/2}$, $Me_3SiO_{1/2}$, $_{2/2}OMeSi-(CH_2)_3-N(CH_2CH=CH_2)-(CH_2)_3-SiMeO_{2/2}$      b)

and $_{2/2}OMeSi-(CH_2)_3-N-(CH_2CH=CH_2)_2$ $Me_2SiO_{2/2}$, $_{1/2}OMe_2Si-(CH_2)_3-N(CH_2CH=CH_2)-(CH_2)_3-SiMe_2O_{1/2}$,      c)

$_{1/2}OMe_2Si-(CH_2)_3-N-(CH_2CH=CH_2)_2$, $_{2/2}OMeSi-(CH_2)_3-N-(CH_2CH=CH_2)_2$ and $_{2/2}OMeSi-(CH_2)_3-N(CH_2CH=CH_2)-(CH_2)_3-SiMeO_{2/2}$ $Me_3SiO_{1/2}$, $Me_2SiO_{2/2}$, $_{2/2}OMeSi-(CH=CH-CH_2)-N-(CH_2C\equiv CH)_2$,      d)

and $_{2/2}OMeSi-(CH=CH-CH_2)-N(CH_2C\equiv CH)-(CH_2CH=CH)-SiMeO_{2/2}$ $Me_2SiO_{2/2}$, $_{1/2}OMe_2Si-(CH=CH-CH_2)-N-(CH_2C\equiv CH)_2$,      e)

$_{1/2}OMe_2Si-(CH=CH-CH_2)-N(CH_2C\equiv CH)-(CH_2CH=CH)-SiMe_2O_{1/2}$ $Me_2SiO_{2/2}$, $_{1/2}OMe_2Si-(CH=CH-CH_2)-N-(CH_2C\equiv CH)_2$,      f)

$_{1/2}OMe_2Si-(CH=CH-CH_2)-N(CH_2C\equiv CH)-(CH_2CH=CH)-SiMe_2O_{1/2}$ $_{2/2}OMeSi-(CH=CH-CH_2)-N-(CH_2C\equiv CH)_2$ and $_{2/2}OMeSi-(CH=CH-CH_2)-N(CH_2C\equiv CH)-(CH_2CH=CH)-SiMeO_{2/2}$ $Me_3SiO_{1/2}$, $Me_2SiO_{2/2}$, $_{2/2}OMeSi-(CH_2CH(Me)-CH_2)-N-(CH_2C(Me)=CH_2)_2$ and      g)

$_{2/2}OMeSi-(CH_2CH(Me)-CH_2)-N(CH_2C(Me)=CH_2)-(CH_2CH(Me)CH_2)-SiMeO_{2/2}$ $Me_2SiO_{2/2}$, $_{1/2}OMe_2Si-(CH_2CH(Me)-CH_2)-N-(CH_2C(Me)=CH_2)_2$ and      h)

$_{1/2}OMe_2Si-(CH_2CH(Me)-CH_2)-N(CH_2C(Me)=CH_2)-(CH_2CH(Me)CH_2)-SiMe_2O_{1/2}$ $Me_2SiO_{2/2}$, $_{1/2}OMe_2Si-(CH_2CH(Me)-CH_2)-N-(CH_2C(Me)=CH_2)_2$,      i)

$_{1/2}OMe_2Si-(CH_2CH(Me)-CH_2)-N(CH_2C(Me)=CH_2)-(CH_2CH(Me)CH_2)-SiMe_2O_{1/2}$ $_{2/2}OMeSi-(CH_2CH(Me)-CH_2)-N-(CH_2C(Me)=CH_2)_2$ and $_{2/2}OMeSi-(CH_2CH(Me)CH_2)-N(CH_2C(Me)=CH_2)-CH_2CH(Me)CH_2-SiMeO_{2/2}$ $Me_3SiO_{1/2}$, $Me_2SiO_{2/2}$, $_{2/2}OMeSi-(CH=CH-CH_2)-NH-(CH_2C\equiv CH)$      j)

and $_{2/2}OMeSi-(CH=CH-CH_2)-NH-(CH_2CH=CH)-SiMeO_{2/2}$ $Me_2SiO_{2/2}$, $_{1/2}OMe_2Si-(CH=CH-CH_2)-NH-(CH_2C\equiv CH)$,      k)

$_{1/2}OMe_2Si-(CH=CH-CH_2)-NH-(CH_2CH=CH)-SiMe_2O_{1/2}$ $Me_2SiO_{2/2}$, $_{1/2}OMe_2Si-(CH=CH-CH_2)-NH-(CH_2C\equiv CH)$,      l)

$_{1/2}OMe_2Si-(CH=CH-CH_2)-NH-(CH_2CH=CH)-SiMe_2O_{1/2}$

-continued $_{2/2}$OMeSi—(CH=CH—CH$_2$)—NH—(CH$_2$C≡CH) and $_{2/2}$OMeSi—(CH=CH—CH$_2$)—NH—(CH$_2$CH=CH)—SiMeO$_{2/2}$ Me$_3$SiO$_{1/2}$, Me$_2$SiO$_{2/2}$, $_{2/2}$OMeSi—(CH$_2$CH(Me)—CH$_2$)—NH—(CH$_2$C(Me)=CH$_2$) and  m)

$_{2/2}$OMeSi—(CH$_2$CH(Me)CH$_2$)—NH—(CH$_2$CH(Me)CH$_2$)—SiMeO$_{2/2}$

Me$_2$SiO$_{2/2}$, $_{1/2}$OMe$_2$Si—(CH$_2$CH(Me)—CH$_2$)—NH—(CH$_2$C(Me)=CH$_2$),  n)

and $_{1/2}$OMe$_2$Si—(CH$_2$CH(Me)—CH$_2$)—NH—(CH$_2$CH(Me)CH$_2$)—SiMe$_2$O$_{1/2}$ Me$_2$SiO$_{2/2}$, $_{1/2}$OMe$_2$Si—(CH$_2$CH(Me)—CH$_2$)—NH—(CH$_2$C(Me)=CH$_2$),  o)

$_{1/2}$OMe$_2$Si—(CH$_2$CH(Me)—CH$_2$)—NH—(CH$_2$CH(Me)CH$_2$)—SiMe$_2$O$_{1/2}$ $_{2/2}$OMeSi—(CH$_2$CH(Me)—CH$_2$)—NH—(CH$_2$C(Me)=CH$_2$) and $_{2/2}$OMeSi—(CH$_2$CH(Me)CH$_2$)—NH—(CH$_2$CH(Me)CH$_2$)—SiMe$_2$O$_{2/2}$ Me$_2$SiO$_{2/2}$, $_{1/2}$OMe$_2$Si—(CH$_2$)$_3$—NH—(CH$_2$)$_3$—SiMe$_2$O$_{1/2}$ and  q)

$_{1/2}$OMe$_2$Si—(CH$_2$)$_3$—NH—CH$_2$CH=CH$_2$

Me$_3$SiO$_{1/2}$, Me$_2$SiO$_{2/2}$, $_{2/2}$OMeSi—(CH$_2$)$_3$—NH—CH$_2$CH=CH$_2$ and  r)

$_{2/2}$OMeSi—(CH$_2$)$_3$—NH—(CH$_2$)$_3$—SiMeO$_{2/2}$

Me$_2$SiO$_{2/2}$, $_{1/2}$OMe$_2$Si—(CH$_2$)$_3$—NH—(CH$_2$)$_3$—SiMe$_2$O$_{1/2}$  s)

$_{1/2}$OMe$_2$Si—(CH$_2$)$_3$—NH—CH$_2$CH=CH$_2$, $_{2/2}$OMeSi—(CH$_2$)$_3$—NH—CH$_2$CH=CH$_2$ and $_{2/2}$OMeSi—(CH$_2$)$_3$—NH—(CH$_2$)$_3$—SiMeO$_{2/2}$ Me$_2$SiO$_{2/2}$, $_{1/2}$OMe$_2$Si—(CH$_2$)$_3$—N—(CH$_2$)$_3$—SiMe$_2$O$_{1/2}$  t)
                                                      |
                              CH$_2$CH=CH$_2$ $_{1/2}$OMe$_2$Si—(CH$_2$)$_3$—N—CH$_2$CH=CH$_2$
                            |
                         CH$_2$CH=CH$_2$ and $_{2/2}$OMeSi—(CH$_2$)$_3$—[OCH$_2$CH$_2$]$_6$—OMe, where Me is the methyl radical.

The novel organosilicon compounds containing amino groups have an amine number of preferably from 0.003 to 6, where the amine number corresponds to the number of ml of 1N HCl required to neutralize 1 g of the substance.

The novel organosilicon compounds containing amino groups have an average molecular weight of from 500 to 1,000,000 g/mol, preferably from 5000 to 150,000 g/mol.

The novel organosilicon compounds containing amino groups have a viscosity of from 10 to 1,000,000 mm$^2$/s, preferably from 20 to 100,000 mm$^2$/s, at 25° C.

The novel organosilicon compounds containing amino groups are preferably ones which comprise
a) siloxane units of the formula $$R_2SiO \quad (I'),$$

b) per molecule at least two siloxane units of the formula $$AR_2SiO_{1/2} \quad (II'),$$

and at least one unit per molecule of the formula $$O_{1/2}R_2SiA^1R_2SiO_{1/2} \quad (III'),$$

where A, A$^1$ and R have one of the meanings given for them above.

The novel organosilicon compounds containing amino groups are preferably ones which consist of units of the formulae (I'), (II') and (III'), in particular those having the following structural formula:

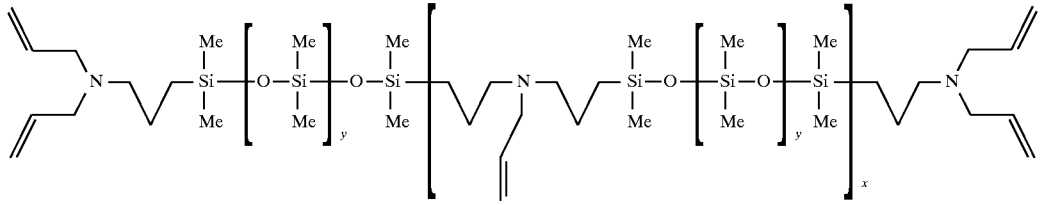

x = 1 to 10, y = 8, 12, 53, 103

The invention further provides a process for preparing the novel organosilicon compounds containing amino groups, which comprises reacting organosilicon compounds comprising units of the formula

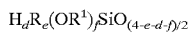

$$H_d R_e (OR^1)_f SiO_{(4-e-d-f)/2} \quad (IX),$$

where
R and $R^1$ have the meanings given for them above,
d is 0 or 1, on average from 0.01 to 1,
e is 0, 1, 2 or 3 and
f is 0, 1, 2 or 3, with the proviso that the sum d+e+f is $\leq 3$ and the organosilicon compound contains at least one Si-bonded hydrogen atom, with amines of the formula

$$R^3{}_z N(-CR^4{}_2-R^5)_{(3-z)} \quad (X),$$

where $R^3$, $R^4$, $R^5$ and z have the meanings given above, in the presence of catalysts which promote the addition of Si-bonded hydrogen onto aliphatic carbon-carbon multiple bonds.

The organosilicon compounds containing at least one Si-bonded hydrogen and comprising units of formula (IX) which are used according to the invention have a content of Si-bonded hydrogen of at least 0.04% by weight, preferably from 0.1% to 1.6% by weight.

The organosilicon compounds containing at least one Si-bonded hydrogen and comprising units of formula (IX) which are used according to the invention have an average viscosity of from 5 to 20,000 mm²/s, preferably from 10 to 5000 mm²/S, more preferably from 10 to 2000 mm²/s, in each case at 25° C.

In the process of the invention, the organosilicon compounds containing at least one Si-bonded hydrogen atom per molecule which are used are preferably those of the formula

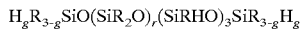

$$H_g R_{3-g} SiO(SiR_2 O)_r (SiRHO)_s SiR_{3-g} H_g \quad (XI),$$

where
R has the meanings given for it above,
g is 0 or 1,
r is 0 or an integer from 1 to 1500, preferably from 1 to 500, and
s is 0 or an integer from 1 to 200, preferably from 1 to 100, with the proviso that the organosilicon compounds contain at least one Si-bonded hydrogen atom per molecule and the r units —(SiR₂O)— and the s units —(SiRHO)— can have any distribution in the molecule.

Examples of the organosilicon compounds containing at least one Si-bonded hydrogen atom per molecule which are used according to the invention are α,ω-trimethylsilyl-terminated dimethyl/methylhydrogenpolysiloxane, α,ω-dimethylhydrogensilyl-terminated dimethylpolysiloxane, α,ω-dimethylhydrogensilyl-terminated dimethyl/methylhydrogenpolysiloxane having a content of Si-bonded hydrogen of from 0.1 to 1.6 percent by weight.

The organosilicon compounds containing at least one Si-bonded hydrogen atom which are used according to the invention are commercial products or can be prepared by methods known in silicon chemistry.

Examples of the amines of formula (X) used according to the invention are diallylamine, triallylamine, dipropargylamine, tripropargylamine, tri(2-methylallyl)amine, di(2-methylallyl)amine, di(2-butenyl)amine, tri(2-butenyl)amine, methyldiallylamine, ethyldiallylamine, methyldipropargylamine and ethyldipropargylamine.

The amines of formula (X) which are used according to the invention are preferably diallylamine, triallylamine, dipropargylamine, tripropargylamine, tri(2-methallyl)amine and methyldiallylamine, with diallylamine and triallylamine being more preferred.

The amines of formula (X) which are used according to the invention are commercial products or can be prepared by methods known in organic chemistry.

In the process of the invention, an amine of formula (X) is used in amounts from 1.1 to 30 mol, preferably from 1.5 to 20 mol, of amine are present per gram atom of Si-bonded hydrogen in the organosilicon compound comprising units of formula (IX).

As catalysts which promote the addition of Si-bonded hydrogen onto aliphatic multiple bonds, the process of the invention can also make use of the same catalysts which could be used for promoting the addition of Si-bonded hydrogen onto aliphatic multiple bonds. The catalysts are preferably a metal from the platinum group or a compound or a complex of a platinum group metal. Examples of such catalysts are metallic and finely divided platinum which can be present on supports such as silicon dioxide, aluminum oxide or activated carbon, compounds or complexes of platinum such as platinum halides, e.g. $PtCl_4$, $H_2PtCl_6 \cdot 6 H_2O$, $Na_2PtCl_6 \cdot 4 H_2O$, platinum-olefin complexes, platinum-alcohol complexes, platinum-alkoxide complexes, platinum-ether complexes, platinum-aldehyde complexes, platinum-ketone complexes including reaction products of $H_2PtCl_6 \cdot 6H_2O$ and cyclohexanone, platinum-vinylsiloxane complexes such as platinum-1,3-divinyl-1,1,3,3-tetramethyldisiloxane complexes with or without a content of detectable inorganically bound halogen, bis(γ-picoline) platinum dichloride, trimethylenedipyridineplatinum dichloride, dicyclopentadieneplatinum dichloride, (dimethyl sulfoxide)(ethylene)platinum(II) dichloride, cyclooctadieneplatinum dichloride, norbornadiene-platinum dichloride, γ-picolineplatinum dichloride, cyclopentadieneplatinum dichloride and also reaction products of platinum tetrachloride with olefin and primary amine or secondary amine or primary and secondary amine as described in U.S. Pat. No. 4,292,434, for example the reaction product of platinum tetrachloride dissolved in 1-octene with sec-butylamine, or ammonium-platinum complexes as described in EP-B 1 10 370. Furthermore, the hydrosilylation-promoting catalysts used can also be compounds and complexes of rhodium such as the rhodium complexes described in EP-A 476 426.

In the process of the invention, catalyst is used in amounts of from 2 to 300 ppm by weight (parts by weight per million parts by weight), preferably in amounts of from 5 to 100 ppm by weight, in each case calculated as elemental platinum and based on the total weight of amine of formula (X) and organosilicon compound containing Si-bonded hydrogen and comprising unit of formula (IX) which are used.

The process of the invention is preferably carried out at the pressure of the surrounding atmosphere, i.e. between 900 and 1100 hPa; however, it can also be carried out at higher or lower pressures.

The process of the invention is carried out at a temperature of from 70° to 150° C., preferably from 100° to 130° C.

Organic solvents which are inert in respect of the reaction of the invention can be used in the process of the invention, but this is not preferred.

Examples of such inert, organic solvents are toluene, xylene, isophorone, octane isomers, butyl acetate and isopropanol.

After the reaction of the invention is complete, the resulting organosilicon compound containing amino groups can be isolated by known methods, for example by removal, preferably by distillation, of excess amine and any organic solvent used.

The process of the invention has the advantage that it is simple to carry out and achieves a very high, complete conversion. Despite this simplicity of the reaction (procedure), the process of the invention also has the advantage that the proportion of aliphatically unsaturated radicals, the viscosity and the proportion of siloxane units of formulae (II), (III) and (IV) can be set in a targeted manner.

Furthermore, the process of the invention has the advantage that the organosilicon compounds containing at least one Si-bonded hydrogen are reacted polymeranalogously with the amines at relatively low temperature without danger of crosslinking or gelling via the further aliphatically unsaturated groups remaining on the amine and without inhibition of the catalyst, with short reaction times and without discoloration.

Optionally, the organosilicon compounds containing amino groups and obtained by the process of the invention can be equilibrated with organopolysiloxanes (1), preferably selected from the group consisting of linear organopolysiloxanes containing terminal triorganosiloxy groups, linear organopolysiloxanes containing terminal hydroxyl groups, cyclic organopolysiloxanes and copolymers of diorganosiloxane and monoorganosiloxane units, which, for example, makes it possible to set the desired molecular weight and also to achieve a targeted distribution of the amino groups in the molecule.

Preference is given to using as linear organopolysiloxanes containing terminal triorganosiloxy groups those of the formula

    (XII), as linear organopolysiloxanes containing terminal hydroxyl groups those of the formula

    (XIII), as cyclic organopolysiloxanes those of the formula

    (XIV), and as copolymers those comprising units of the formulae

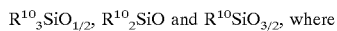, where $R^{10}$ can each be identical or different and have one of the meanings given for R,
u is 0 or an integer from 1 to 1500,
v is 0 or an integer from 1 to 1500 and
t is an integer from 3 to 12.

In the equilibration which may be carried out, the ratios of the organopolysiloxanes (1) used and the organopolysiloxanes containing amino groups and prepared according to the invention are determined only by the desired proportion of the amino groups in the organopolysiloxanes produced in any such equilibration and by the desired mean chain length.

In the equilibration which may be carried out, preference is given to using basic catalysts which promote equilibration. Examples of such catalysts are benzyltrimethylammonium hydroxide, tetramethylammonium hydroxide, alkali metal hydroxide and alkaline earth metal hydroxide in methanolic solution and also silanolates. Preference is given to alkali metal hydroxides which are used in amounts of from 50 to 10,000 ppm by weight (parts per million), preferably from 500 to 2000 ppm by weight, in each case based on the total weight of the organosilicon compounds used.

The equilibration which may be carried out is preferably carried out at from 80° to 150° C. and at the pressure of the surrounding atmosphere, i.e. between 900 and 1100 hPa. However, it can also be carried out at higher or lower pressures.

The equilibration can, optionally, be carried out in a water-immiscible solvent such as toluene, but this is not preferred. If such organic solvents are used, amounts of from 5% to 20% by weight, based on the total weight of the organosilicon compounds used, are preferred.

Before the work-up of the mixture obtained in the equilibration according to the invention, the catalyst can be inactivated.

The organosilicon compounds containing amino groups of the invention or prepared according to the invention have the advantage that they are odorless and transparent.

Furthermore, the organosilicon compounds containing amino groups of the invention or prepared according to the invention have the advantage that they can be crosslinked using compounds containing Si-bonded hydrogen.

The organosilicon compounds prepared according to the invention have the advantage that they can be crosslinked by a free radical mechanism.

In addition, the organosilicon compounds containing amino groups prepared according to the invention have the advantage that they act as complexing ligands for transition metals.

The organosilicon compounds containing amino groups prepared according to the invention can be used for all purposes for which organosilicon compounds containing amino groups or aliphatically unsaturated radicals have been used, for example for textile finishing, fiber treatment, for carpets, leather finishing, for polish, in addition-crosslinkable systems such as paper coatings, and in rubbers.

Thus, for example, the organosilicon compounds prepared according to the invention can be used in compositions, in particular emulsions, for the treatment of organic fibers of all types, e.g. textiles of cotton and/or synthetic fibers, or leather, with such compositions of the invention usually leading to a permanent, hydrophilic finish on said materials with a soft feel which may be desired.

When used in textile finishing, the organosilicon compounds prepared according to the invention have the advantage that the textiles finished therewith display low yellowing, a very high hydrophilicity and a very good soft feel.

In addition, the organosilicon compounds prepared according to the invention can be used as polymeric promoters in addition-crosslinking systems. They accelerate the crosslinking of these systems and thus lower the pot life.

In the following examples, all parts and percentages are, unless otherwise indicated, by weight. Unless otherwise indicated, the following examples are carried out at the pressure of the surrounding atmosphere, i.e. at about 1000 hPa, and at room temperature, i.e. at about 20° C. or at the temperature which is established on combining the reactants at room temperature without additional heating or cooling. All viscosities mentioned in the examples are at a temperature of 25° C.

The iodine number in the following examples is the number of grams of iodine which are consumed in the addition onto the aliphatic multiple bonds per 100 gram of material to be examined.

EXAMPLE 1

21.9 g of triallylamine (0.160 mol) are initially charged under nitrogen blanketing and heated to 120° C. At this temperature, 465 μl (50 ppm of platinum) of an acetylacetonyl-cyclooctenylplatinum(II) acetylacetonate catalyst in isobutyl methyl ketone are added. Subsequently, 60.0 g (0.159 mol of Si—H) of a α,107-dihydrogenpolydimethylsiloxane having a viscosity of 3.5 mm²/s are metered in over a period of 60 minutes and the reaction mixture is stirred under reflux for 3 hours at a temperature of 120° C. The volatile constituents are then removed at 110° C. and a pressure of 5 mbar. Cooling and subsequent filtration gives a yellowish oil having a viscosity of 75 mm²/s and an iodine number of 81.38. The yield is 96.9%.

EXAMPLE 2

43.7 g of triallylamine (0.320 mol) are initially charged under nitrogen blanketing and heated to 120° C. At this temperature, 537 μl (50 ppm of platinum) of an acetylacetonylcyclooctenyl-platinum(II) acetylacetonate catalyst in isobutyl methyl ketone are added. Subsequently, 50.0 g (0.091 mol of Si—H) of a α,ω-dihydrogenpolydimethylsiloxane having a viscosity of 8.3 mm²/s are metered in over a period of 60 minutes and the reaction mixture is stirred under reflux for 7 hours at a temperature of 120° C. The volatile constituents are then removed at 110° C. and a pressure of 5 mbar. Cooling and subsequent filtration gives a yellowish oil having a viscosity of 30 mm²/s and an iodine number of 71.63. The yield is 93.0%.

EXAMPLE 3

4.48 g of triallylamine (0.032 mol) are initially charged in 10.0 g of toluene under nitrogen blanketing and heated to 120° C. At this temperature, 44 μl (50 ppm of platinum) of a hexachloroplatinic acid catalyst in isopropanol are added. Subsequently, 64.0 g (0.032 mol of Si—H) of a α,ω-dihydrogenpolydimethylsiloxane having a viscosity of 67.0 mm²/s are metered in over a period of 60 minutes and the reaction mixture is stirred under reflux for 10 hours at a temperature of 120° C. The volatile constituents are then removed at 110° C. and a pressure of 5 mbar. Cooling and subsequent filtration gives a yellowish oil having a viscosity of 304 mm²/s and an iodine number of 14.84. The yield is 91.1%.

EXAMPLE 4

4.48 g of triallylamine (0.032 mol) are initially charged under nitrogen blanketing and heated to 120° C. At this temperature, 430 μl (50 ppm of platinum) of an acetylacetonyl-cyclooctenyl-platinum(II) acetylacetonate catalyst in isobutyl methyl ketone are added. Subsequently, 64.0 g (0.032 mol of Si—H) of a α,ω-dihydrogenpolydimethylsiloxane having a viscosity of 67.0 mm²/s are metered in over a period of 60 minutes and the reaction mixture is stirred for 2 hours at a temperature of 120° C. The volatile constituents are then removed at 110° C. and a pressure of 5 mbar. Cooling and subsequent filtration gives a yellowish oil having a viscosity of 400 mm²/s and an iodine number of 15.89. The yield is 97.0%.

EXAMPLE 5

4.48 g of triallylamine (0.032 mol) and 64.0 g (0.032 mol of Si—H) of a α,ω-dihydrogenpolydimethylsiloxane having a viscosity of 67.0 mm²/s are initially charged under nitrogen blanketing and heated to 120° C. At this temperature, 44 μl (50 ppm of platinum) of a hexachloroplatinic acid catalyst in isopropanol are added. Subsequently, the reaction mixture is stirred for 10 hours at a temperature of 120° C. The volatile constituents are then removed at 110° C. and a pressure of 5 mbar. Cooling and subsequent filtration gives a yellowish oil having a viscosity of 351 mm²/s and an iodine number of 15.13. The yield is 94.2%.

EXAMPLE 6

65.49 g of triallylamine (0.477 mol) are initially charged under nitrogen blanketing and heated to 120° C. At this temperature, 3384 μl (50 ppm of platinum) of an acetylacetonylcyclooctenyl-platinum(II) acetylacetonate catalyst in isobutyl methyl ketone are added. Subsequently, 530.0 g (0.136 mol) of Si—H) of a α,ω-dihydrogenpolydimethylsiloxane having a viscosity of 171.0 mm²/s are metered in over a period of 60 minutes and the reaction mixture is stirred for 10 hours at a temperature of 120° C. The volatile constituents are then removed at 110° C. and a pressure of 5 mbar. Cooling and subsequent filtration gives a yellowish oil having a viscosity of 311 mm²/s and an iodine number of 13.40. The yield is 94.2%.

EXAMPLE 7

32.93 g of triallylamine (0.240 mol) are initially charged under nitrogen blanketing and heated to 120° C. At this temperature, 1114 μl (50 ppm of rhodium) of a tris-(triphenylphosphine)rhodium(I) chloride catalyst in toluene are added. Subsequently, 64.0 g (0.032 mol of Si—H) of a α,ω-dihydrogenpolydimethylsiloxane having a viscosity of 67.0 mm²/s are metered in over a period of 60 minutes and the reaction mixture is stirred for 3 hours at a temperature of 120° C. The volatile constituents are then removed at 110° C. and a pressure of 5 mbar. Cooling and subsequent filtration gives a yellowish oil having a viscosity of 148 mm²/s and an iodine number of 25.32. The yield is 98.4%.

EXAMPLE 8

Stage 1:

6.54 g (0.019 mol) of an allylated polyglycol (methyl- or allyl-terminated with 6 ethoxy groups) having a viscosity of 11.6 mm²/s, 90.0 g (0.039 mol of Si—H) of a α,ω-trimethylsilyl-terminated dimethyl/methylhydrogenpolysiloxane having a mean chain length of 210 and a viscosity of 675 mm²/s are initially charged in 9.8 g of n-butyl acetate and admixed at 100° C. with 25 μl (20 ppm of platinum) of a hexachloroplatinic acid catalyst in isopropanol. The reaction mixture is stirred for 4 hours at a temperature of 100° C. The iodine number is 25.32 and the conversion is 45.3%.

Stage 2:

5.20 g of triallylamine (0.038 mol) are initially charged under nitrogen blanketing and heated to 120° C. At this temperature, 522 μl (50 ppm of platinum) of an acetylacetonyl-cyclooctenylplatinum(II) acetylacetonate catalyst in isobutyl methyl ketone are added. Subsequently, the reaction solution from stage 1 is metered in over a period of 60 minutes. The reaction mixture is stirred for 5 hours at a temperature of 120° C. The volatile constituents are then removed at 110° C. and a pressure of 5 mbar. Cooling and subsequent filtration gives a yellowish oil having a viscosity of 1800 mm²s. The yield is 95%.

EXAMPLE 9

3.825 g of diallylamine (39.37 mmol) are initially charged and heated to 120° C. under nitrogen blanketing. At this temperature, 475 ml (50 ppm of platinum) of an acetylacetonyl-cyclooctenylplati-num(II) acetylacetonate catalyst in methyl isobutyl ketone are added. Subsequently, 80 g (39.36 mmol) of a polydimethylsiloxane having hydrogens in the α and ω positions and a viscosity of 67.0 mm²/s are metered in over a period of 60 minutes and the reaction mixture is stirred under reflux for 32 hours at a temperature of 120° C. The low molecular weight, volatile constituents are then removed at 110° C. and a pressure of 5 mbar. Cooling and subsequent filtration gives a yellowish oil having a viscosity of 366 mm²/s, an iodine number of 29.9 and an amine number of 0.43. The yield is 95.8%.

EXAMPLE 10

3.666 g of dipropargylamine (39.37 mmol) are initially charged and heated to 120° C. under nitrogen blanketing. At this temperature, 475 ml (50 ppm of platinum) of an acetylacetonyl-cyclooctenylplatinum(II) acetylacetonate catalyst in methyl isobutyl ketone are added. Subsequently, 80 g (39.36 mmol) of a polydimethylsiloxane having hydrogens in the α and ω positions and a viscosity of 67.0 mm²/s are metered in over a period of 60 minutes and the reaction mixture is stirred under reflux for 35 hours at a temperature of 120° C. The low molecular weight, volatile constituents are then removed at 110° C. and a pressure of 5 mbar. Cooling and subsequent filtration gives a yellowish oil having a viscosity of 372 mm²/s, an iodine number of 28.5 and an amine number of 0.38. The yield is 95.4%.

EXAMPLE 11

5.164 g of tripropargylamine (39.37 mmol) are initially charged and heated to 120° C. under nitrogen blanketing. At this temperature, 484 ml (50 ppm of platinum) of an acetylacetonyl-cyclooctenyl-platinum(II) acetylacetonate catalyst in methyl isobutyl ketone are added. Subsequently, 80 g (39.36 mmol) of a polydimethylsiloxane having hydrogens in the α and ω positions and a viscosity of 67.0 mm²/s are metered in over a period of 60 minutes and the reaction mixture is stirred under reflux for 32 hours at a temperature of 120° C. The low molecular weight, volatile constituents are then removed at 110° C. and a pressure of 5 mbar. Cooling and subsequent filtration gives a yellowish oil having a viscosity of 390 mm²/s, an iodine number of 22.5 and an amine number of 0.40. The yield is 94.2%.

What is claimed is:

1. An organosilicon compound containing amino groups and comprising a) siloxane units of the formula

where

R is an identical or different hydrocarbon radical having from 1 to 18 carbon atoms, optionally substituted by halogen atoms, alkoxy groups or hydroxy groups and where the hydrocarbon radical is optionally interrupted by oxygen atoms, $R^1$ is an identical or different alkyl radical which is optionally interrupted by oxygen atoms, a is 0, 1, 2 or 3 and b is 0, 1, 2 or 3, with the proviso that the sum a+b is not greater than 3, and b) per molecule at least one unit selected from the group consisting of units of the formulae

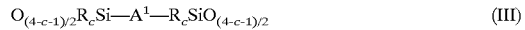

or

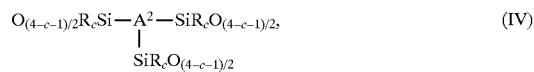

where

R is identical or different and has the meaning given for R above,

C is 0, 1 or 2,

A is a radical of the formula

$A^1$ is a radical of the formula

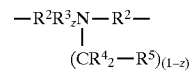

and $A^2$ is a radical of the formula

where z is 0 or 1, $R^2$ is an identical or different alkylene radical having from 2 to 8 carbon atoms, a radical of the formula

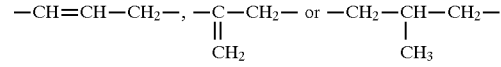

where $R^3$ is a hydrogen atom or an alkyl radical having from 1 to 8 carbon atoms, $R^4$ is a hydrogen atom or an alkyl radical having from 1 to 8 carbon atoms, $R^5$ is a radical of the formulae $-CR^6=CR^6{}_2$, $-C\equiv CR^6$, where $R^6$ is an identical or different hydrogen atom or alkyl radical having from 1 to 8 carbon atoms, with the proviso that the organosilicon compound containing amino groups has at least one siloxane unit of formula (II) per molecule and at least one unit selected from the group consisting of units of formulae (III) and (IV) per molecule.

2. An organosilicon compound containing amino groups as claimed in claim 1 comprising a) siloxane units of the formula

b) at least two siloxane units per molecule of the formula

and at least one unit per molecule of the formula $$O_{1/2}R_2SiA^1R_2SiO_{1/2} \quad (III'),$$

where
A is a radical of the formula $$-R^2R^3{}_zN(-CR^4{}_2-R^5)_{(2-z)} \quad (V),$$

$A^1$ is a radical of the formula $$-R^2R^3{}_zN-R^2- \atop (CR^4{}_2-R^5)_{(1-z)} \quad (VI)$$

and

R is an identical or different hydrocarbon radical having from 1 to 18 carbon atoms, optionally substituted by halogen atoms, alkoxy groups or hydroxy groups and where the hydrocarbon radical is optionally interrupted by oxygen atoms.

3. An organosilicon compound containing amino groups as claimed in claim 1, consisting of units of formulae (I'), (II') and (III').

4. A process for preparing the novel organosilicon compounds containing amino groups as claimed in claim 1, comprising; reacting organosilicon compounds of the formula $$H_dR_e(OR^1)_fSiO_{(4-e-d-f)/2} \quad (IX),$$

where

R is an identical or different hydrocarbon radical having from 1 to 18 carbon atoms, optionally substituted by halogen atoms, alkoxy groups or hydroxy groups and where the hydrocarbon radical is optionally interrupted by oxygen atoms, and $R^1$ is an identical or different alkyl radical which is optionally interrupted by oxygen atoms, d is 0 or 1, e is 0, 1, 2 or 3 and f is 0, 1, 2 or 3, with the proviso that the sum d+e+f is ≦3 and the organosilicon compound contains at least one Si-bonded hydrogen atom, with amines of the formula $$R^3{}_2N(-CR^4{}_2-R^5)_{(3-z)} \quad (X),$$

where $R^3$ is a hydrogen atom or an alkyl radical having from 1 to 8 carbon atoms, $R^4$ is a hydrogen atom or an alkyl radical having from 1 to 8 carbon atoms, $R^5$ is a radical of the formulae $-CR^6=CR^6{}_2$, $-C\equiv CR^6$, where $R^6$ is an identical or different hydrogen atom or alkyl radical having from 1 to 8 carbon atoms, and z is 0 or 1, in the presence of a catalyst which promotes the addition of Si-bonded hydrogen onto aliphatic carbon-carbon multiple bonds.

5. The process as claimed in claim 4, wherein the organosilicon compounds comprising units of formula (IX) are those of the formula $$H_gR_{3-g}SiO(SiR_2O)_r(SiRHO)_sSiR_{3-g}H_g \quad (XI),$$

where

R is an identical or different hydrocarbon radical having from 1 to 18 carbon atoms, optionally substituted by halogen atoms, alkoxy groups or hydroxy groups and where the hydrocarbon radical is optionally interrupted by oxygen atoms, g is 0 or 1, r is 0 or an integer from 1 to 1500 and s is 0 or an integer from 1 to 200, with the proviso that the organosilicon compounds contain at least one Si-bonded hydrogen atom per molecule and the r units $-(SiR_2O)-$ and the s units $-(SiRHO)-$ are distributed in any manner throughout the molecule.

6. The process as claimed in claim 4, wherein amine is present per gram atom of Si-bonded hydrogen in the organosilicon compound comprising units of formula (TX) in an amount of from 1.1 to 30 mole.

7. The process as claimed in claim 4, wherein organosilicon compounds comprising units of formula (IX), are reacted with amines of the general formula (X) in the presence of a catalyst which promotes the addition of Si-bonded hydrogen onto aliphatic carbon-carbon multiple bonds and equilibrating the resulting reaction product with organopolysiloxanes (1).

* * * * *

UNITED STATES PATENT AND TRADEMARK OFFICE
CERTIFICATE OF CORRECTION

PATENT NO : 5,840,951
DATED : November 24, 1998
INVENTOR(S) : THOMAS HIERSTETTER ET AL.

It is certified that error appears in the above-identified patent and that said Letters Patent are hereby corrected as shown below:

Column 18, line 36, claim 6, "(TX)" should be --(IX)--.

Signed and Sealed this

Sixth Day of April, 1999

Attest:

Attesting Officer

Q. TODD DICKINSON

Acting Commissioner of Patents and Trademarks